US011330187B2

(12) United States Patent
Ueno

(10) Patent No.: US 11,330,187 B2
(45) Date of Patent: May 10, 2022

(54) ELECTRONIC APPARATUS, METHOD OF CONTROLLING ELECTRONIC APPARATUS, AND STORAGE MEDIUM

(71) Applicant: CANON KABUSHIKI KAISHA, Tokyo (JP)

(72) Inventor: Daiyu Ueno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 16/995,366

(22) Filed: Aug. 17, 2020

(65) Prior Publication Data

US 2021/0058540 A1 Feb. 25, 2021

(30) Foreign Application Priority Data

Aug. 19, 2019 (JP) ............................ JP2019-149903

(51) Int. Cl.
*H04N 5/228* (2006.01)
*H04N 5/235* (2006.01)
*H04N 5/262* (2006.01)

(52) U.S. Cl.
CPC ......... *H04N 5/2351* (2013.01); *H04N 5/2355* (2013.01); *H04N 5/2621* (2013.01)

(58) Field of Classification Search
CPC .. H04N 5/2351; H04N 5/2621; H04N 5/2355; H04N 5/232935
See application file for complete search history.

(56) References Cited

U.S. PATENT DOCUMENTS

2009/0303375 A1* 12/2009 Ohyama ............ H04N 5/23218 348/333.12
2015/0154903 A1* 6/2015 Miura ................. G09G 3/2003 345/690
2016/0055624 A1* 2/2016 Ohno ..................... G09G 5/003 345/589

FOREIGN PATENT DOCUMENTS

JP 2009-130464 A 6/2009
JP 2017-139613 A 8/2017

* cited by examiner

*Primary Examiner* — Kelly L Jerabek
(74) *Attorney, Agent, or Firm* — Cowan, Liebowitz & Latman, P.C.

(57) ABSTRACT

An electronic apparatus includes an operation member configured to receive user operation to specify at least a part of a brightness range of a first image using a percentage; a combining unit configured to generate a second image by combining a pattern image with a region of the first image, the region corresponding to the part of the brightness range specified by the user operation; and an output unit configured to output the second image to a display unit.

12 Claims, 9 Drawing Sheets

FIG.5

| ZEBRA SETTING | |
|---|---|
| ZEBRA DISPLAY SETTING | ON |
| ZEBRA SELECTION | ZEBRA1 |
| ZEBRA 1 LEVEL | 70±5% |
| ZEBRA 2 LEVEL | 100% |

| SET VALUE (%) | FULL RANGE (SDR BRIGHTNESS VALUE) | VIDEO RANGE (SDR BRIGHTNESS VALUE) | FULL RANGE (HDR BRIGHTNESS VALUE) | VIDEO RANGE (HDR BRIGHTNESS VALUE) |
|---|---|---|---|---|
| 100% | 255 | 235 | 1023 | 940 |
| 95% | 242 | 224 | 971 | 896 |
| 87% | 221 | 206 | 890 | 826 |
| ~ | ~ | ~ | ~ | ~ |
| 5% | 12 | 26 | 51 | 107 |
| 0% | 0 | 16 | 0 | 64 |

ELECTRONIC APPARATUS, METHOD OF CONTROLLING ELECTRONIC APPARATUS, AND STORAGE MEDIUM

BACKGROUND OF THE INVENTION

Field of the Invention

The present invention relates to an electronic apparatus, a method of controlling the electronic apparatus, and a storage medium.

Description of the Related Art

A known conventional method of confirming brightness signals of an image when exposure adjustment or the like is performed during image capturing is a method of displaying a pattern image called a "zebra" for a range of brightness signal values (brightness values; code values) which is set in advance (e.g. Japanese Patent Application Publication No. 2009-130464).

Normally in such an electronic apparatus as a digital camera, signals of a still image or moving image are constituted of brightness signals in a full range (full gradation). In the field of broadcasting, on the other hand, signals of a still image or moving image are normally constituted of brightness signals in a video range (limited range; limited gradation).

In many cases, displays to receive broadcast signals support only the video range, therefore in the case of outputting video signals from a digital camera to such a display, the signals are converted (compressed) from the full range into the video range, and then outputted.

In this case, if the user refers to the waveform monitor of the video signals, which were converted from the full range to the video range, on the display, and sets the display of zebra by specifying the brightness signal values using the digital camera, then the zebra may be displayed at a position (in a region) that is different from the intention of the user.

SUMMARY OF THE INVENTION

An object of the present invention is to enable displaying an image of a pattern at a position intended by a user.

An aspect of the present invention is an electronic apparatus including an operation member configured to receive user operation to specify at least a part of a brightness range of a first image using a percentage; a combining unit configured to generate a second image by combining a pattern image with a region of the first image, the region corresponding to the part of the brightness range specified by the user operation; and an output unit configured to output the second image to a display unit.

Another aspect of the present invention is a method of controlling an electronic apparatus, the method including: a receiving step of receiving user operation to specify at least a part of a brightness range of a first image using a percentage; a combining step of generating a second image by combining a pattern image with a region of the first image, the region corresponding to the brightness range specified by the user operation; and an output step of outputting the second image to a display unit.

Another aspect of the present invention is a program that causes a computer to execute the steps of the above method. Another aspect of the present invention is a computer-readable storage medium storing a program that causes a computer to execute the steps of the above method.

Further features of the present invention will become apparent from the following description of exemplary embodiments with reference to the attached drawings.

BRIEF DESCRIPTION OF THE DRAWINGS

FIG. 5 is an example of a zebra setting screen according to the embodiment;

FIG. 7 is an example of a conversion table according to the embodiment;

DESCRIPTION OF THE EMBODIMENTS

Embodiment

General Configuration

Figure 1A:
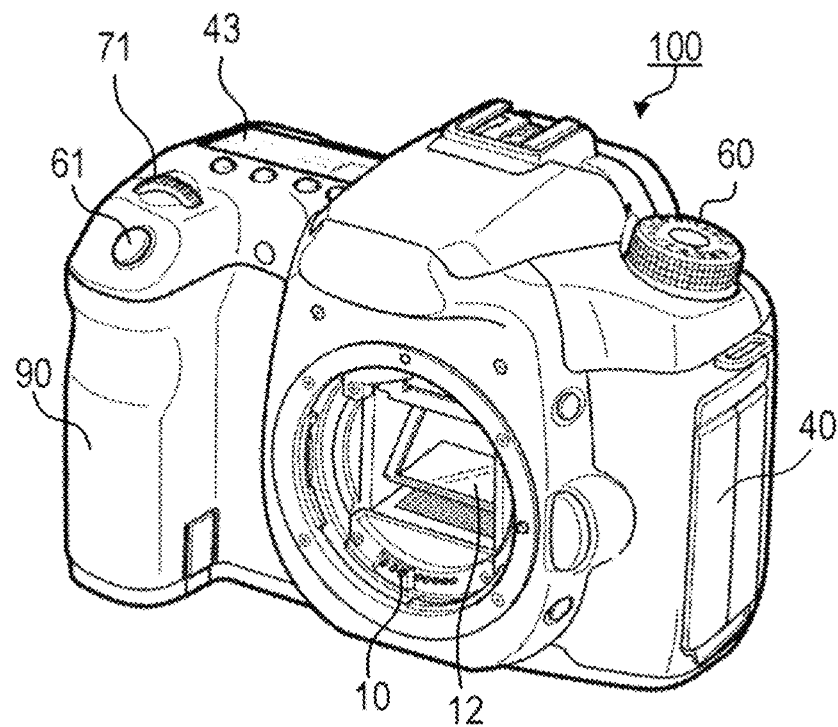
FIG. 1A and FIG. 1B are external views of a digital camera according to an embodiment of the present invention.
Figure 1B:
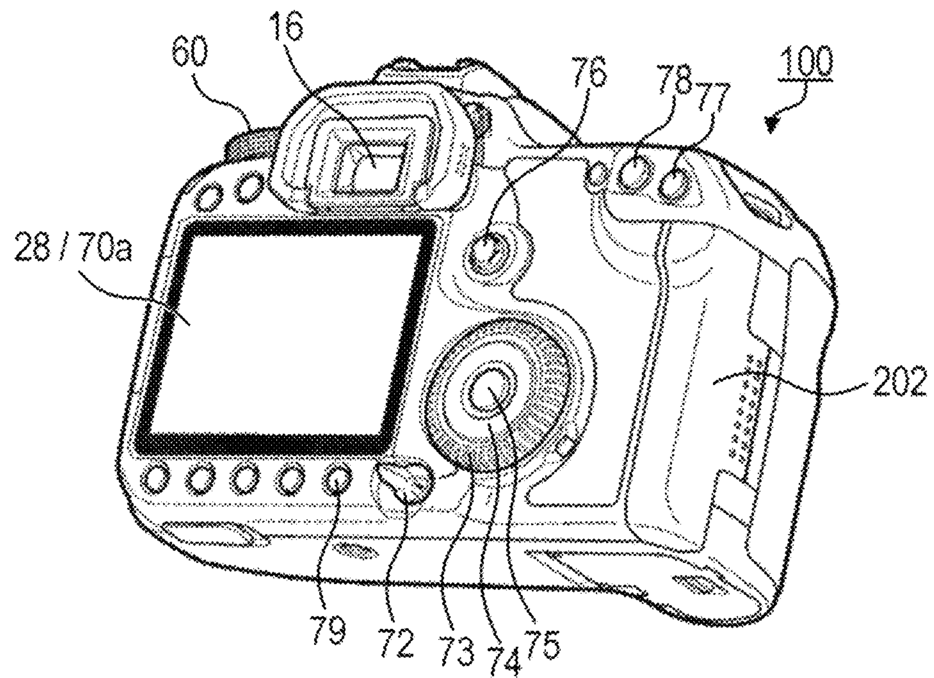

A preferred embodiment of the present invention will be described with reference to the drawings. FIG. 1A and FIG. 1B are external views of a digital camera 100 (imaging apparatus), which is an example of an apparatus to which the present invention is applicable. FIG. 1A is a front perspective view of the digital camera 100, and FIG. 1B is a rear perspective view of the digital camera 100.

A display unit 28 is a display unit disposed on the rear surface of the digital camera 100, and displays images and various information. An extra-finder display unit 43 is a display unit disposed on the upper surface of the digital camera 100, and displays various set values of the digital camera 100, such as the shutter speed and aperture. A terminal cover 40 is a cover to protect each connector (not illustrated) for a connection cable or the like, which connects the digital camera 100 to an external apparatus. A quick return mirror 12 moves up/down by an actuator (not illustrated) according to the instructions from a system control unit 50 (described later). A communication terminal 10 is a communication terminal for the digital camera 100 to communicate with a lens unit 150 (detachable, described later). An eye piece finder 16 is a peep type finder for viewing a focusing screen 13 (described later), so as to confirm the focal point and composition of an optical image of an object acquired via the lens unit 150. A cover 202 is a cover of a slot to store a recording medium 200 (described later). A grip 90 is a holding unit having such a shape that the user can easily hold the digital camera 100 with their right hand to capture images.

The digital camera 100 also includes a mode selection switch 60, a shutter button 61, a main electronic dial 71, a power switch 72, a sub-electronic dial 73, a four-direction key 74, a SET button 75 and an LV button 76. The digital camera 100 also includes a magnifying button 77, a demagnifying button 78, and a reproduction button 79. The digital camera 100 may include other operation members. Each operation member will be described later.

Figure 2:
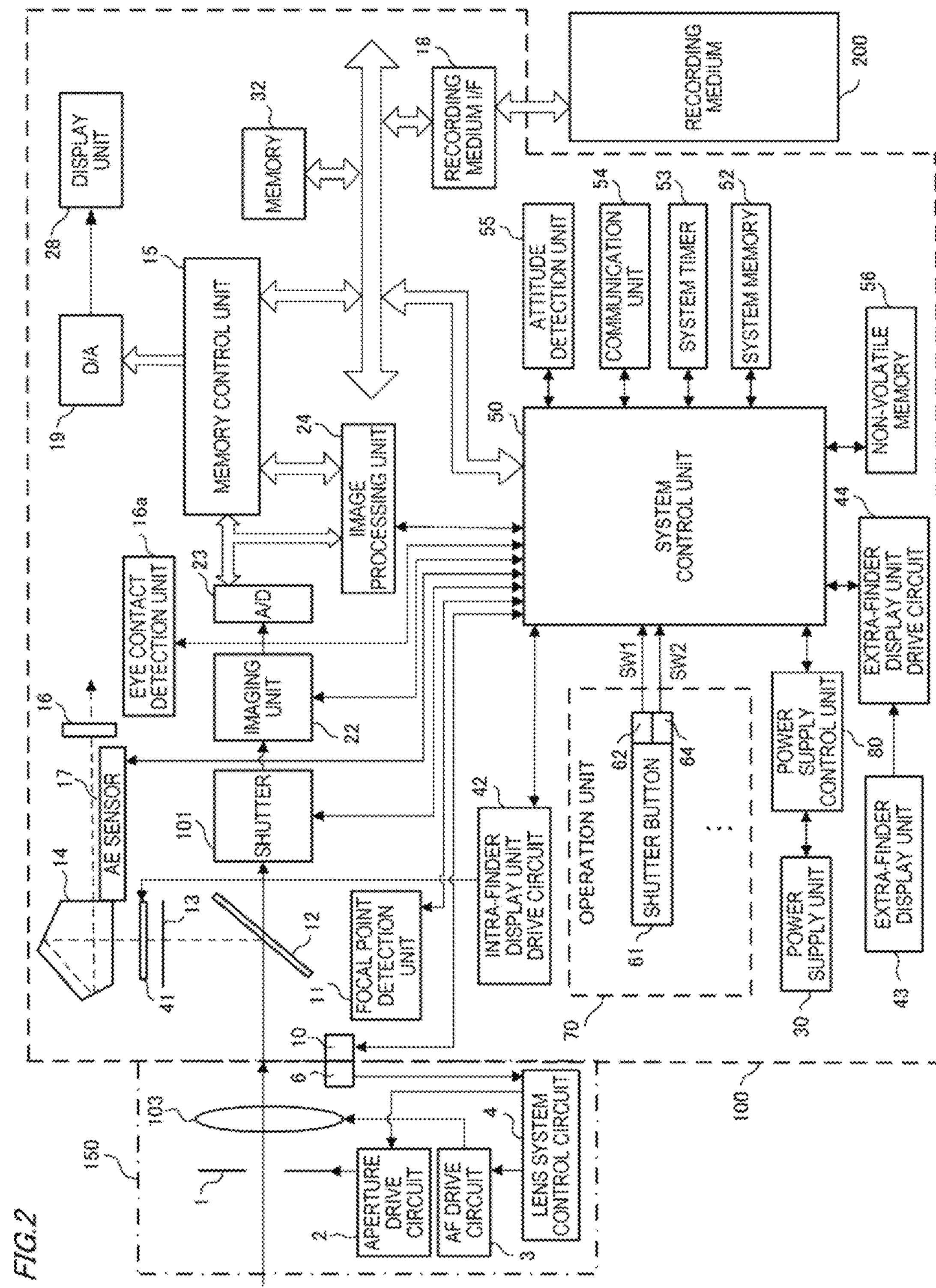
FIG. 2 is a block diagram of the digital camera according to the embodiment.

FIG. 2 is a block diagram depicting a configuration example of the digital camera 100.

A lens unit 150 is a lens unit equipped with a replaceable image capturing lens. A lens 103 is normally constituted of a plurality of lenses, but is illustrated as one lens in FIG. 2 for simplification. A communication terminal 6 is a communication terminal for the lens unit 150 to communicate with the digital camera 100, and a communication terminal 10 is a communication terminal for the digital camera 100 to communicate with the lens unit 150. The lens unit 150 communicates with the system control unit 50 via these communication terminals 6 and 10. Then the lens unit 150 controls an aperture 1 via an aperture drive circuit 2 using an internal lens system control circuit 4. The lens unit 150 also performs focusing by moving the position of the lens 103 via an AF drive circuit 3 using the lens system control circuit 4.

An auto exposure (AE) sensor 17 measures the brightness of an object (object light) through the lens unit 150.

A focal point detection unit 11 outputs defocus amount information to the system control unit 50. Based on the defocus amount information, the system control unit 50 controls the lens unit 150 and performs phase difference AF.

The quick return mirror 12 (hereafter mirror 12) is moved up/down by an actuator (not illustrated) based on the instructions from the system control unit 50 when exposure, live view image capturing, moving image capturing and the like are executed. The mirror 12 is a mirror to switch luminous flux which entered from the lens 103 between the finder 16 side and the imaging unit 22 side. The mirror 12 is normally disposed so as to guide (reflect) the luminous flux to the finder 16 (mirror down), but when image capturing or live view display is performed, the mirror 12 is moved up from the luminous flux so that the luminous flux is guided to the imaging unit 22 (mirror up). The center portion of the mirror 12 is a half mirror where a part of the light transmits through, and a part of the luminous flux transmits through the center portion and enters the focal point detection unit 11 to detect a focal point.

The user views the focusing screen 13 via a penta-prism 14 and the finder 16, whereby the focal point and composition of an optical image of an object captured through the lens unit 150 can be confirmed.

A shutter 101 is a focal plane shutter that can freely control the exposure time of the imaging unit 22 based on the control of the system control unit 50.

The imaging unit 22 is an image pickup element constituted of a CCD, a CMOS element or the like, to convert an optical image into electric signals. An A/D convertor 23 converts analog signals outputted from the imaging unit 22 into digital signals.

An image processing unit 24 performs a predetermined processing (e.g. pixel interpolation, resizing, such as demagnifying, color conversion processing) on the data from the A/D convertor 23 or on the data from a memory control unit 15. The image processing unit 24 also performs a predetermined arithmetic processing using the captured image data, and the system control unit 50 performs exposure control and distance measurement control based on the acquired arithmetic result. Thereby through-the-lens (TTL) type auto focus (AF) processing, AE processing, pre-flash emission (EF) processing and the like are performed. Furthermore, the image processing unit 24 perform a predetermined arithmetic processing using the captured image data, and performs TTL type auto white balance (AWB) processing based on the acquired arithmetic result.

The output data from the A/D convertor 23 is written in a memory 32 via the image processing unit 24 and the memory control unit 15, or via the memory control unit 15 alone. The memory 32 stores image data which was acquired by the imaging unit 22 and converted into digital data by the A/D convertor 23, and the image data to be displayed on the display unit 28. The memory 32 has a sufficient storage capacity to store a predetermined number of still images and a predetermined time of moving images and sounds.

The memory 32 is also used as a memory for image display (video memory). A D/A convertor 19 converts the data for image display that is stored in the memory 32 into analog signals, and supplies the analog signals to the display unit 28. In this way, the image data for display that is written in the memory 32 is displayed on the display unit 28 via the D/A convertor 19. The display unit 28 performs display on a display such as an LCD in accordance with the analog signals from the D/A convertor 19. Digital signals, which are converted from analog signals by the A/D convertor 23 and stored in the memory 32, are converted into analog signals by the D/A convertor 19, and sequentially transferred to the display unit 28, enabling achievement of a function as an electronic view finder and performing the through image display (live view display). An image that is displayed by the live view display is hereafter referred to as an "LV image".

On the intra-finder display unit 41, a frame to indicate a distance measuring point at which auto focus is currently performed (AF frame), and an icon to indicate the setting state of the camera, are displayed via the intra-finder display unit drive circuit 42.

On the extra-finder display unit 43, various set values of the digital camera 100, such as the shutter speed and aperture, are displayed via an extra-finder display unit drive circuit 44.

A non-volatile memory 56 is a memory which is electrically erasable and recordable, such as EEPROM. In the non-volatile memory 56, constants and programs for operating the system control unit 50, for example, are recorded. "Programs" here refers to programs for executing various flow charts, which will be described later in this embodiment.

The system control unit 50 is a control unit constituted of at least one processor or circuit, and controls the digital camera 100 in general. The system control unit 50 implements each processing of this embodiment (described later) by executing the programs recorded in the above mentioned non-volatile memory 56. A system memory 52 is RAM, for example. The system control unit 50 develops, in the system memory 52, the constants and variables for operating the system control unit 50 and the programs read from the non-volatile memory 56. The system control unit 50 also controls display by controlling the memory 32, the D/A convertor 19, the display unit 28 and the like.

A system timer 53 is a clock unit that measures the time used for various controls, and the time of the internal clock.

A power supply control unit 80 is constituted of a battery detection circuit, a DC-DC convertor, switch circuits to switch blocks to be energized, and detects whether a battery is installed, the type of the battery, and the residual amount of the battery power, for example. The power supply control unit 80 also controls the DC-DC convertor based on the detection result and the instruction from the system control unit 50, and supplies the required voltage to each unit, including the recording medium 200, for a required period of time. A power supply unit 30 is constituted of a primary battery (e.g. alkali battery, lithium battery), a second battery (e.g. NiCd battery, NiMH battery, Li battery), an AC adaptor and the like.

A recording medium I/F 18 is an interface with the recording medium 200 (e.g. memory card, hard disk). The recording medium 200 is a recording medium to record captured images, such as a memory card, and is constituted of a semiconductor memory, a magnetic disk and the like.

A communication unit 54 transmits/receives video signals and sound signals to/from an external apparatus connected wirelessly or via cable. The communication unit 54 can also be connected with a wireless local area network (LAN) and the Internet. The communication unit 54 can also communicate with an external apparatus via Bluetooth (registered trademark) or Bluetooth Low Energy. The communication unit 54 can transmit an image (including LV image) captured by the imaging unit 22 and an image recorded in the recording medium 200, and receive image data and various other information from an external apparatus.

An attitude detection unit 55 detects an attitude of the digital camera 100 with respect to the gravity direction. Based on the attitude detected by the attitude detection unit 55, it can be determined whether an image captured by the imaging unit 22 is an image captured by the digital camera 100 held horizontally, or an image captured by the digital camera 100 held vertically. The system control unit 50 can attach the orientation information, in accordance with the attitude detected by the attitude detection unit 55, to an image file of an image captured by the imaging unit 22, or can record the image in the rotated state. For the attitude detection unit 55, an acceleration sensor, a gyro sensor or the like can be used. The motion of the digital camera 100 (e.g. pan, tilt, lift, still) can be detected using the acceleration sensor or gyro sensor of the attitude detection unit 55.

An operation unit 70 is an operation unit that inputs various operation instructions to the system control unit 50. The operation unit 70 includes various operation members which constitute an input unit (receiving unit) that receives operation from the user (user operation). For example, the operation unit 70 includes a push button, a rotation dial and a touch sensor. In concrete terms, the operation unit 70 includes the mode selection switch 60, the shutter button 61, the main electronic dial 71, the power switch 72, the sub-electronic dial 73 and the four-direction key 74. The operation unit 70 also includes the SET button 75, the LV button 76, the magnifying button 77, the demagnifying button 78 and the reproduction button 79. To each operation member of the operation unit 70, an appropriate function is assigned for each scene, by selecting various function icons displayed on the display unit 28, for example, whereby each operation member functions as various function buttons. The function buttons are, for example, an end button, return button, image switching button, jump button, preview button and attribute change button. If the menu button is pressed, for example, a menu screen, which allows various settings, is displayed on the display unit 28. The user can intuitively perform various settings using the menu screen displayed on the display unit 28, the four-direction key 74 and the SET button 75.

The mode selection switch 60 is an operation member to switch various modes. The mode selection switch 60 switches the operation mode of the system control unit 50 to the still image recording mode, the moving image capturing mode or the reproduction mode, for example. The modes included in the still image recording mode are: auto image capturing mode, auto scene determination mode, manual mode, aperture priority mode (Av mode), shutter speed priority mode (Tv mode) and program AE mode. Various scene modes and custom modes to perform image capturing settings for each image capturing scene are also included. Using the mode selection switch 60, the user can directly select any one of these modes. The user may also select an image capturing mode list screen using the mode selection switch 60 first, then select one of the plurality of modes displayed on the list using another operation member. In the same manner, a plurality of modes may be included in the moving image capturing mode.

The shutter button 61 is an operation member to instruct image capturing. The shutter button 61 includes a first shutter switch 62 and a second shutter switch 64. The first shutter switch 62 is turned ON in mid-operation of the shutter button 61, that is, in the half-depressed state (image capturing preparation instruction), and generates a first shutter switch signal SW1. By the first shutter switch signal SW1, the system control unit 50 starts such an operation as the AF processing, AE processing, AWB processing and EF processing. The second shutter switch 64 is turned ON when the operation of the shutter button 61 completes, that is, in the fully-depressed state (image capturing instruction), and generates a second shutter switch signal SW2. By the second shutter switch signal SW2, the system control unit 50 starts a series of operations of image capturing processing, from reading signals from the imaging unit 22 to writing the image data to the recording medium 200.

The main electronic dial 71 is a rotational operation member, and such set values as the shutter speed and aperture can be changed, for example, by turning the main electronic dial 71. The power switch 72 is an operation member to switch ON/OFF of the power supply of the digital camera 100. The sub-electronic dial 73 is a rotational operation member, and the selection frame can be moved or images can be switched, for example, by turning the sub-electronic dial 73. The four-direction key 74 is configured such that the upper part, lower part, left part and right part of the key can be pressed respectively. Processing corresponding to the pressed part of the four-direction key 74 can be performed. The SET button 75 is a push button mainly used to determine a selected item.

The LV button 76 is a button to switch live view (hereafter LV) ON/OFF in the still image capturing mode. In the moving image capturing mode, the LV button 76 is used to instruct the start or stop of a moving image capturing (recording). The magnifying button 77 is an operation button to switch the magnifying mode ON/OFF in the live view display in the image capturing mode, and to change the magnification used in the magnifying mode. In the reproduction mode, the magnifying button 77 functions as a magnifying button to magnify a reproduced image or to increase the magnification thereof. The demagnifying button 78 is a button to reduce the magnification of the magnified reproduced image to demagnify the displayed image. The reproduction button 79 is an operation button to switch between the image capturing mode and the reproduction mode. If the reproduction button 79 is pressed in the image capturing mode, the mode changes to the reproduction mode, in which the latest image, out of the images recorded in the recording medium 200, can be displayed on the display unit 28.

The touch panel 70*a* is an operation member to detect contact to the touch panel 70*a*. The touch panel 70*a* and the display unit 28 can be integrated. For example, the touch panel 70*a* is configured so that the transmittance of the light does not interfere with the display on the display unit 28, and is superimposed on the upper layer of the display surface of the display unit 28. Then the input coordinates on the touch panel 70*a* are corresponded with the display coordinates on the display unit 28. Thereby a graphic user interface (GUI), allowing the user to directly operate the screen displayed on the display unit 28, can be provided. The system control unit 50 can detect the following operations on the touch panel 70*a* or the state thereof A finger or pen which has not previously touched the touch panel 70*a* touches the touch panel 70*a*, that is, touch is started (hereafter Touch-Down)

A finger or pen is touching the touch panel 70*a* (hereafter Touch-On)

A finger or pen is moving in the state of touching the touch panel 70*a* (hereafter Touch-Move)

A finger or pen which is touching the touch panel 70*a* is released from the touch panel 70*a*, that is, touch is ended (hereafter Touch-Up)

Nothing is touching the touch panel 70*a* (hereafter Touch-Off)

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers or pen is detected.

These operations, states and coordinates of the positions of the fingers or pen touching the touch panel 70*a* are notified to the system control unit 50 via the internal bus. Then based on the notified information, the system control unit 50 determines the kind of operation (touch operation) that was performed on the touch panel 70*a*. For Touch-Move, the system control unit 50 can also determine the moving direction of the fingers or pen on the touch panel 70*a*, based on the change of the positional coordinates, for the vertical components and the horizontal components on the touch panel 70*a* respectively. If Touch-Move is detected for at least a predetermined distance, the system control unit 50 determines that the slide operation was performed. An operation of quickly moving a finger on the touch panel 70*a* for a certain distance in the touched state and releasing the finger is called "flick". In other words, flick is an operation of moving and releasing the finger rapidly on the touch panel 70*a*. If Touch-Move is detected for at least a predetermined distance at a predetermined speed or faster, and Touch-Up is detected thereafter, the system control unit 50 determines that flick was performed (determines that flick was performed after the slide operation). Further, a touch operation of touching a plurality of points (e.g. two points) simultaneously and moving these touch positions closer together is called "Pinch-In", and a touch operation of moving these two positions further apart is called "Pinch-Out". Pinch-In and Pinch-Out are collectively called a pinch operation (or simply "pinch"). For the touch panel 70*a*, various types of touch panels may be used, such as a resistive film type, a capacitive type, a surface acoustic wave type, an infrared type, an electromagnetic induction type, an image recognition type and an optical sensor type. There is a type of detecting touch when the touch panel is actually contacted and a type of detecting touch when a finger or pen approaches the touch panel, but either type may be used.

Processing Content

Figure 3:
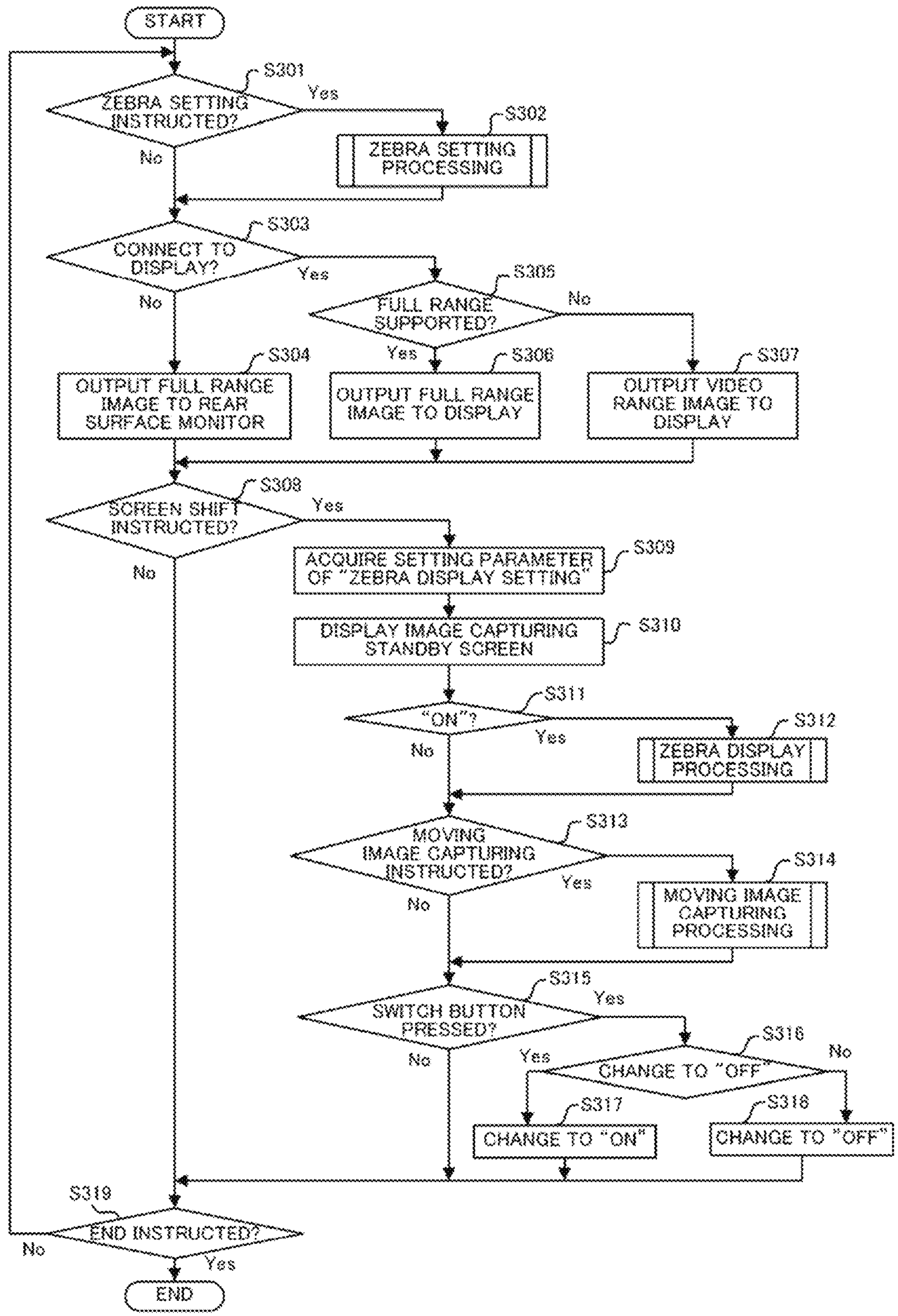
FIG. 3 is a flow chart depicting processing of the digital camera according to the embodiment.

FIG. 3 is a flow chart depicting the processing of the digital camera 100 according to this embodiment. This processing is implemented by the system control unit 50 developing a program, which is stored in the non-volatile memory 56, in the system memory 52, and executing the program. In this embodiment, the above processing is started when the power of the digital camera 100 is turned ON.

In S301, the system control unit 50 determines whether zebra setting is instructed. Processing advances to S302 if the zebra setting instruction is instructed, or to S303 if not. The zebra here refers to a pattern image that is displayed in a range of predetermined brightness signal values (brightness values; code values), and the zebra setting instruction is an instruction (user operation) to start various settings on the zebra.

In S302, the system control unit 50 performs zebra setting processing, which is a processing to set the display mode and other settings of the zebra. In this embodiment, an example when the zebra setting items include: "zebra display setting", "zebra selection", "zebra 1 level", "zebra 2 level" and the like will be described. Further, in this embodiment, an example when the following parameters are selectable as the setting parameters of each setting item will be described. The zebra setting processing will be described in detail later with reference to the flow chart in FIG. 4.

"Zebra display setting": "ON" or "OFF"

"Zebra selection": "zebra 1", "zebra 2" or "zebra 1+2"

"Zebra 1 level": a value in the 5 to 95 range

"Zebra 2 level": a value in the 50 to 100 range

In S303, the system control unit 50 determines whether the digital camera 100 is connected to a display (external display that is separated from the digital camera 100; external apparatus). Processing advances to S305 if the digital camera 100 is connected to the external display, or to S304 if not. It is assumed that the digital camera 100 is connected with the external display wirelessly or via cable.

In S304, the system control unit 50 outputs an image (video image) in the full range (full gradation) to the display unit 28 (rear face monitor). In the case of outputting an image in the standard dynamic range (SDR) at this time, 8-bit brightness signals of which brightness values are 0 to 255 are outputted as the brightness signals of an image in the full range. In the case of outputting an image in the high dynamic range (HDR), 10-bit brightness signals of which brightness values are 0 to 1023 are outputted as the brightness signals of an image in the full range. In this embodiment, it is assumed that the system control unit 50 outputs an image captured by the imaging unit 22 (captured image; target image) to the display unit 28.

Full range (SDR): 0 to 255 (8-bit)

Full range (HDR): 0 to 1023 (10-bit)

In S305, the system control unit 50 determines whether the external display supports the full range output. Processing advances to S306 if the external display supports the full range output, or to S307 if not.

In S306, the system control unit 50 outputs the full range image to the external display. If an image in SDR is outputted at this time, 8-bit brightness signals of which brightness values are 0 to 255 are outputted as the brightness signals of an image in the full range image, just like S304. If an image in HDR is outputted, 10-bit brightness signals of which brightness values are 0 to 1023 are outputted as the brightness signals of an image in the full range image. In this embodiment, it is assumed that the system control unit 50 outputs an image captured by the imaging unit 22 (captured image; target image) to the external display.

In S307, the system control unit 50 outputs an image in the video range (limited range; limited gradation) to the external display. In the case of outputting an image in SDR at this time, 8-bit brightness signals of which brightness values are 16 to 235 are outputted as the brightness signal of an image in the video range. In the case of outputting an image in HDR, 10-bit brightness signals of which brightness values are 64 to 940 are outputted as the brightness signals of an image in the video range. In this embodiment, it is assumed that the system control unit 50 converts (compresses) an image captured by the imaging unit 22 (captured image; target image) to an image in the video range, and outputs the image to the external display.

Video range (SDR): 16 to 235 (8-bit)

Video range (HDR): 64 to 940 (10-bit)

In S308, the system control unit 50 determines whether the shift to the image capturing standby screen is instructed. Processing advances to S309 if the shift to the image capturing standby screen is instructed, or to S319 if not.

In S309, the system control unit 50 acquires a setting parameters of the "zebra display setting". It is assumed that the setting parameter of the "zebra display setting" is stored in the memory 32. It is also assumed that a default setting parameter is acquired if the above mentioned zebra setting processing (S302) was not performed in advance.

In S310, the system control unit 50 displays the image capturing standby screen on the display unit 28 (or external display).

In S311, the system control unit 50 determines whether the "zebra display setting" is "ON". Processing advances to S312 of the "zebra display setting" is "ON", or to S313 if not. In this embodiment, the case where the "zebra display setting" is not "ON" is the case where the "zebra display setting" is "OFF".

In S312, the system control unit 50 performs the zebra display processing. The zebra display processing will be described in detail later with reference to the flow chart in FIG. 6.

In S313, the system control unit 50 determines whether the moving image capturing is instructed. Processing advances to S314 if the moving image capturing is instructed, or to S315 if not. An example of the case where the moving image capturing is instructed is a case where the user presses the LV button 76.

In S314, the system control unit 50 performs the moving image capturing processing. The moving image capturing processing will be described in detail later with reference to the flow chart in FIG. 9.

In S315, the system control unit 50 determines whether a button (not illustrated) to switch the zebra display is pressed. Processing advances to S316 if the button is pressed, or to S319 if not.

Ion S316, the system control unit 50 determines whether the "zebra display setting" is "OFF". Processing advances to S317 if the "zebra display setting" is "OFF", or to S318 if not.

In S317, the system control unit 50 changes the setting parameter of the "zebra display setting" from "OFF" to "ON", and records this setting in the memory 32.

In S318, the system control unit 50 changes the setting parameter of the "zebra display setting" from "ON" to "OFF", and records this setting in the memory 32.

In S319, the system control unit 50 determines whether end of processing is instructed. This processing flow ends if end is instructed, or advances to S301 if not. An example of a case where end is instructed is a case where the user presses the power switch 72 and the power of the digital camera 100 is turned OFF. Even in the middle of this processing flow, this processing flow may be interrupted (ended), as in the case where the user operates an operation unit 70, such as a mode dial.

Zebra Setting Processing (S302)

Figure 4:
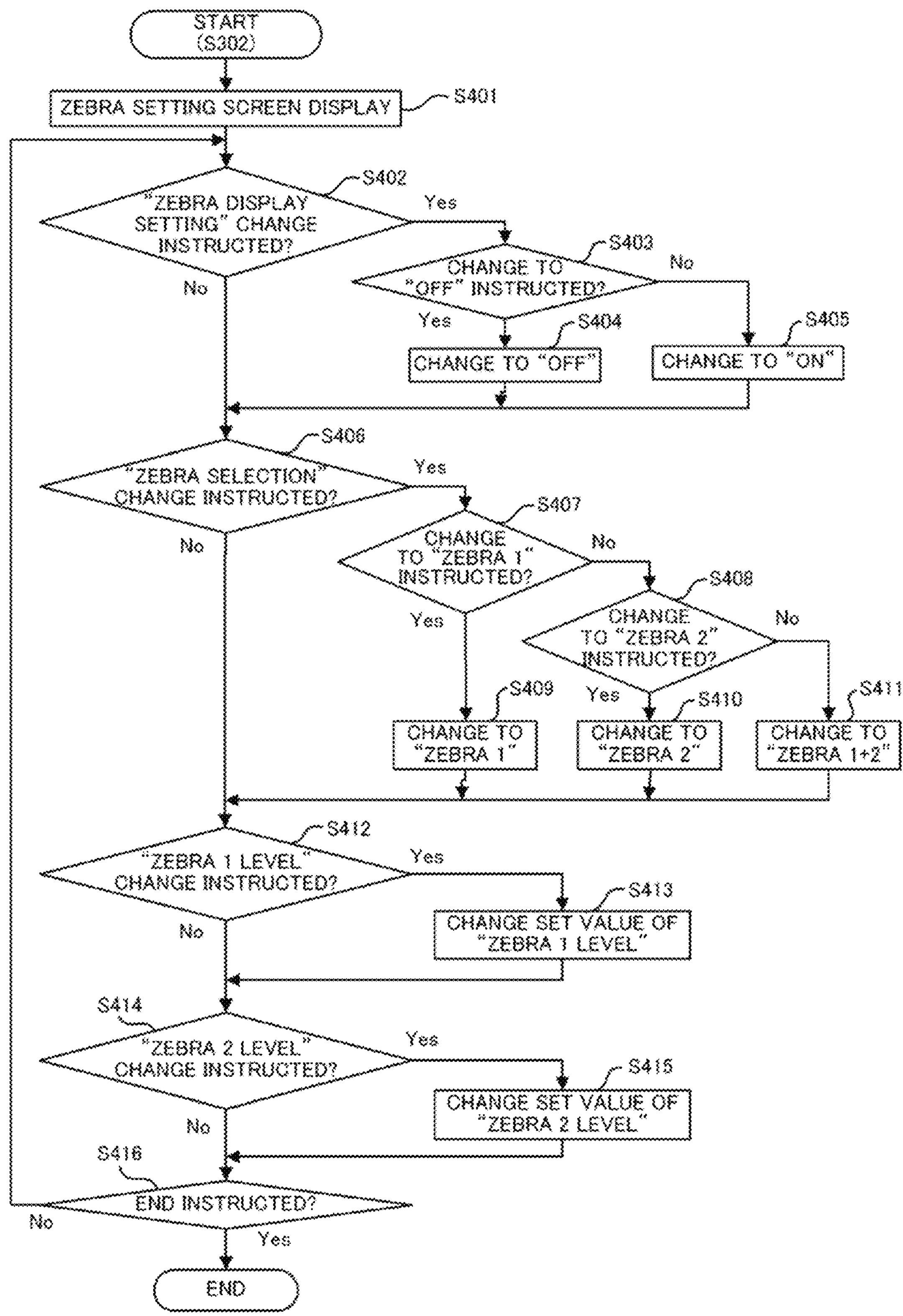
FIG. 4 is a flow chart depicting zebra setting processing according to the embodiment.

FIG. 4 is a flow chart depicting the zebra setting processing (S302) according to this embodiment.

In S401, the system control unit 50 displays the zebra setting screen on the display unit 28.

Figure 5:
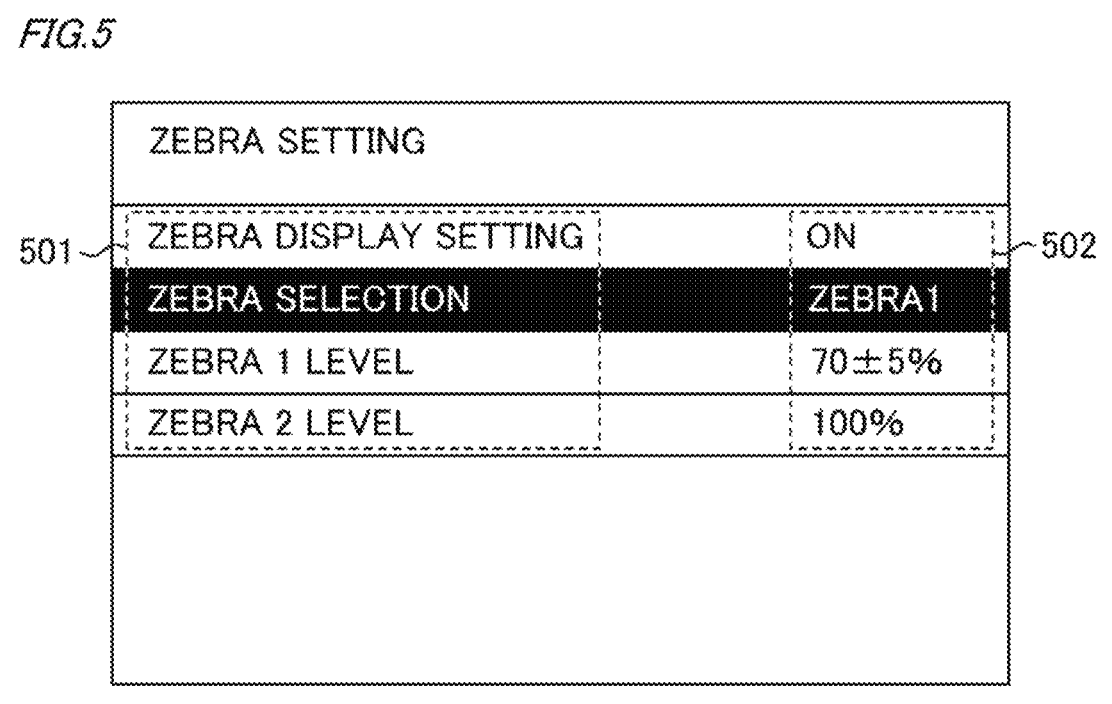

FIG. 5 is an example of the zebra setting screen according to this embodiment. The sign 501 indicates the setting items of the zebra display, and the sign 502 indicates the setting parameter of each setting item.

In S402, the system control unit 50 determines whether a change (setting) of the "zebra display setting" is instructed. Processing advances to S403 if the change of the "zebra display setting" is instructed (if a change instruction is received), or to S406 if not.

In S403, the system control unit 50 determines whether the instruction in S402 is an instruction to change the setting parameter of the "zebra display setting" to "OFF". Processing advances to S404 if the instruction is the instruction to change the setting parameter to "OFF", or to S405 if not.

In S404, the system control unit 50 changes the setting parameter of the "zebra display setting" to "OFF", and records this setting in the memory 32.

In S405, the system control unit 50 changes the setting parameter of the "zebra display setting" to "ON", and records this setting in the memory 32.

In S406, the system control unit 50 determines whether the change of the "zebra selection" is instructed. Processing advances to S407 if the change of the "zebra selection" is instructed, or to S412 if not.

In S407, the system control unit 50 determines whether the instruction in S406 is an instruction to change the setting parameter of the "zebra selection" to "zebra 1". Processing advances to S409 if the instruction is the instruction to change the setting parameter to "zebra 1", or to S408 if not.

In S408, the system control unit 50 determines whether the instruction in S406 is an instruction to change the setting parameter of the "zebra selection" to "zebra 2". Processing advances to S410 if the instruction is the instruction to change the setting parameter to "zebra 2", or to S411 if not.

In S409, the system control unit 50 changes (sets) the setting parameter of the "zebra selection" to "zebra 1", and records this setting to the memory 32.

In S410, the system control unit 50 changes (sets) the setting parameter of the "zebra selection" to "zebra 2", and records this setting in the memory 32.

In S411, the system control unit 50 changes (sets) the setting parameter of the "zebra selection" to "zebra 1+2", and records this setting in the memory 32.

In S412, the system control unit 50 determines whether the change (setting) of the "zebra 1 level" is instructed. Processing advances to S413 if a change of the "zebra 1 level" is instructed, or to S414 if not.

In S413, the system control unit 50 changes the set value (first set value; setting parameter) of the "zebra 1 level" in accordance with the inputted value, and records the set value in the memory 34. In this embodiment, it is assumed that a value in the range of 5 to 95(%) can be set for the set value of the "zebra 1 level", but the value that can be set is not especially limited. In the case of the full range, the set value of the "zebra 1 level" is a value indicated by percentage (%), where the minimum value (0) of the brightness signal is 0%, and the maximum value (e.g. 255, 1023) thereof is 100%. In the case of the video range, the set value of the "zebra 1 level" is indicated by percentage (%), where the minimum value (e.g. 16, 64) of the brightness signal is 0%, and the maximum value (e.g. 235, 940) thereof is 100%. Unlike the above mentioned brightness signal values, these percentage values do not depend on the range (full range or video range)

of the output image (first image; image outputted to the display unit 28 or an external display).

In S414, the system control unit 50 determines whether the change (setting) of the "zebra 2 level" is instructed. Processing advances to S415 if the change of the zebra 2 level" is instructed, or to S416 if not.

In S415, the system control unit 50 changes the set value (second set value; setting parameter) of the "zebra 2 level" to the inputted value, and records this value in the memory 34. In this embodiment, it is assumed that a value in the range of 50 to 100(%) can be set as the set value of the "zebra 2 level", but the value that can be set is not especially limited. Just like the set value of the "zebra 1 level", the set value of the "zebra 2 level" is a value indicated by percentage.

In S416, the system control unit 50 determines whether end of processing is instructed. The zebra setting processing ends if end is instructed, or processing advances to S402 if not. An example of the case where end is instructed is a case where the user performs the operation to close the zebra setting screen. Even in the middle of the zebra setting processing, the zebra setting processing may be interrupted (ended), as in the case where the user operates the operation unit 70, such as a mode dial.

Zebra Display Processing (S312)

Figure 6:
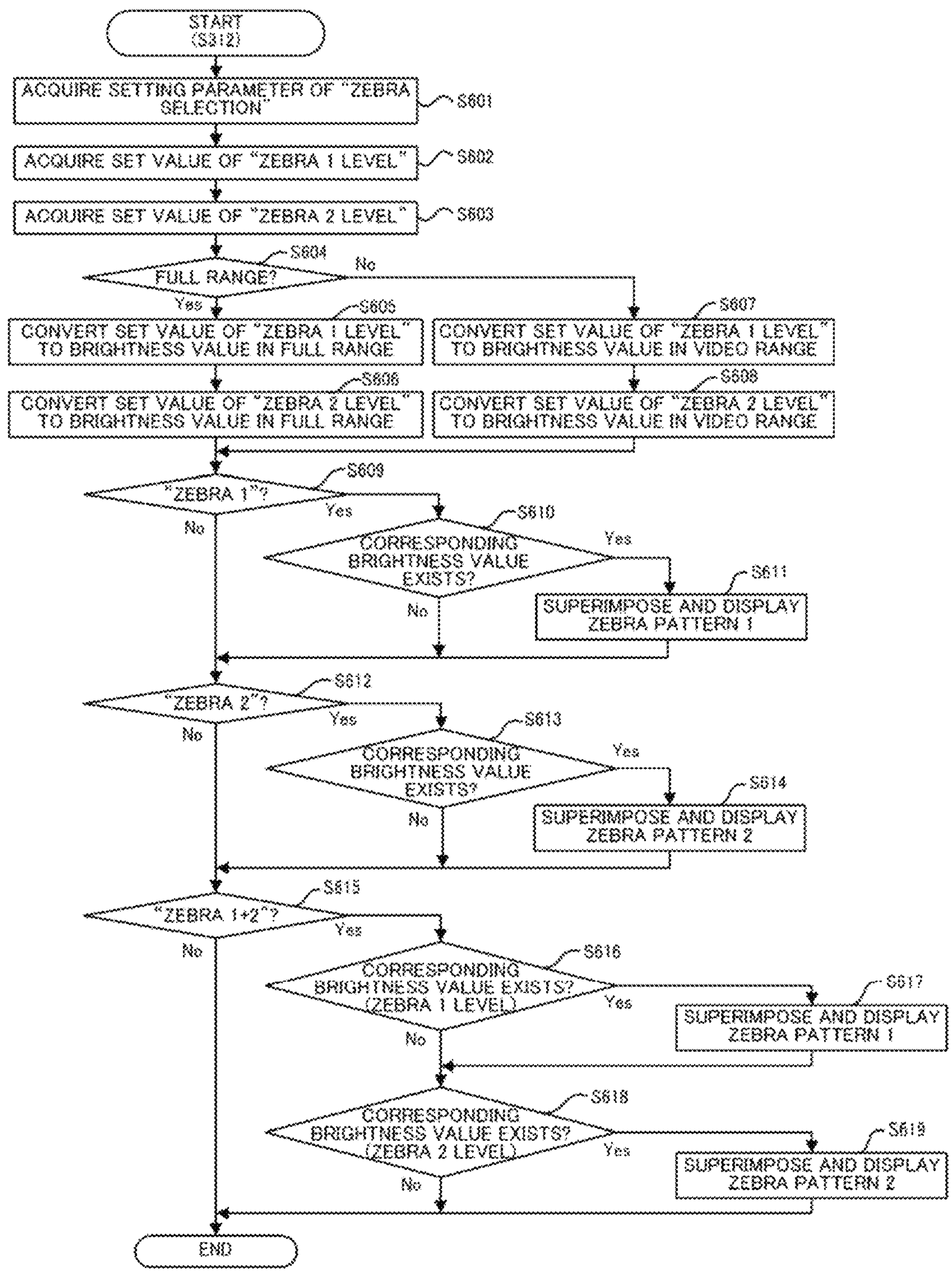
FIG. 6 is a flow chart depicting zebra display processing according to the embodiment.

FIG. 6 is a flow chart depicting the zebra display processing (S312) according to this embodiment.

In S601, the system control unit 50 acquires the setting parameters of the "zebra selection" stored in the memory 32.

In S602, the system control unit 50 acquires the set value of the "zebra 1 level" stored in the memory 32.

In S603, the system control unit 50 acquires the set value of the "zebra 2 level" stored in the memory 32.

In S604, the system control unit 50 determines whether the range of an image (brightness signal of the image) outputted to the display unit 28 or the external display is the full range. Processing advances to S605 if the range is the full range, or to S607 if not. In this embodiment, the case where the image (brightness signal of the image) is not the full range is the case where the range of the image is the video range.

In S605, the system control unit 50 converts the set value (%) of the "zebra 1 level" into the brightness value based on the full range (e.g. SDR: 0 to 255; HDR: 0 to 1023).

FIG. 7 is a conversion table to convert the set value (%) of the "zebra 1 level" into the brightness value. In S605, the set value of the "Zebra 1 level" is converted using the conversion table in FIG. 7. For example, when the set value of the "zebra 1 level" is 100%, the brightness value after conversion is 255 in the case of the full range of SDR, and is 1023 in the case of the full range of HDR. The conversion may be performed using functions instead of the table. The conversion table in FIG. 7 may be regarded as information to correspond the percentage and the brightness value in accordance with the range of the image.

In S606, just like step S605, the system control unit 50 converts the set value (%) of the "zebra 2 level" into the brightness value based on the video range (e.g. SDR: 0 to 255; HDR: 0 to 1023).

In S607, the system control unit 50 converts the set value (%) of the "zebra 1 level" into the brightness value based on the video range (e.g. SDR: 16 to 235; HDR: 64 to 940) by using the conversion table in FIG. 7. For example, when the set value of the "zebra 1 level" is 100%, the brightness value after conversion is 235 in the case of the video range of SDR, and is 940 in the case of the video range of HDR.

In S608, just like step S607, the system control unit 50 converts the set value (%) of the "zebra 2 level" into the brightness value based on the video range (e.g. SDR: 16 to 235; HDR: 64 to 940).

In S609, the system control unit 50 determines whether the setting parameter of the "zebra selection" is "zebra 1". Processing advances to S610 if the setting parameter is "zebra 1", or to S612 if not. The case where the setting parameter is "zebra 1" may be regarded as a case where the set value of the "zebra 1 level" is specified.

In S610, the system control unit 50 determines whether pixels having the brightness values corresponding to the set value of the "zebra 1 level" are included in the output image (first image: image outputted to the display unit 28 or external display). Processing advances to S611 if the pixels are included, or to S612 if not. In this embodiment, the brightness values corresponding to the set value of the "zebra 1 level" is the brightness values included in a range corresponding to ±5% of the set value of the "zebra 1 level". For example, if the set value of the "zebra 1 level" is 80%, the system control unit 50 determines whether the brightness values in the following range corresponding to 75% to 85% are included in the output image. This may be regarded that the system control unit 50 determines whether a brightness value in a range corresponding to the brightness range (partial brightness range), which has a predetermined width centered around the set value of the "zebra 1 level" (first set value), is included in the output image.

Full range (SDR): 191 (75%) to 216 (85%)

Video range (SDR): 180 (75%) to 202 (85%)

Full range (HDR): 767 (75%) to 869 (85%)

Video range (HDR): 721 (75%) to 808 (85%)

In S611, the system control unit 50 displays a first zebra pattern (first pattern image) superimposed on the pixels having the brightness values corresponding to the set value of the "zebra 1 level". In this embodiment, an example when the first zebra pattern is a pattern image of stripes, of which lines are directed from the upper left to the lower right, will be described, but the pattern image is not especially limited. This may be regarded that the system control unit 50 generates an image (second image) by combining the first zebra image with a region of the output image corresponding to the set value of the "zebra 1 level" specified by the user operation. Further, this may also be regarded that the system control unit 50 selects whether the first zebra pattern is combined in accordance with the instruction from the user (instruction to change the setting parameter of the "zebra display setting" or the "zebra selection").

Figure 8:
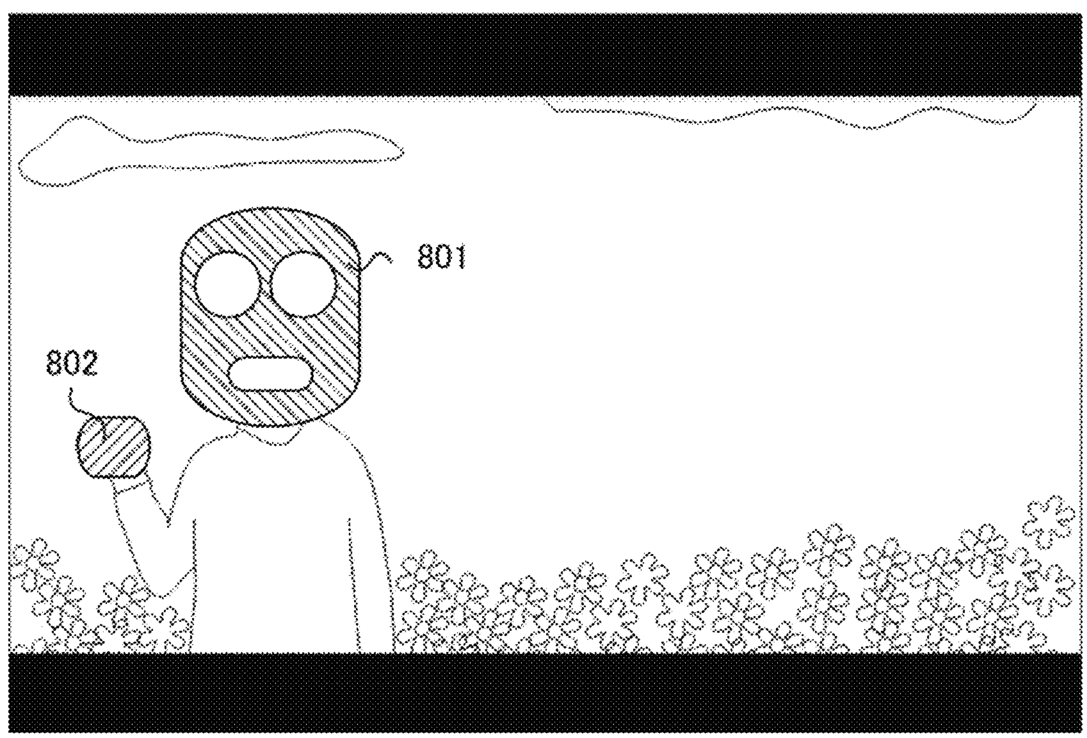
FIG. 8 is an example of an image capturing standby screen according to the embodiment.

FIG. 8 is an example of the image capturing standby screen that is displayed on the display unit 28 or an external display. A pattern image 801 indicates the first zebra pattern. In the example in FIG. 8, an area of the face of the object has brightness values corresponding to the set value of the "zebra 1 level".

In S612, the system control unit 50 determines whether the setting parameter of the "zebra selection" is "zebra 2". Processing advances to S613 if the setting parameter is "zebra 2", or to S615 if not. The case where the setting parameter is "zebra 2" may be regarded as a case where the set value of the "zebra 2 level" is specified.

In S613, the system control unit 50 determines whether pixels having the brightness values corresponding to the set value of the "zebra 2 level" are included in the output image. Processing advances to S614 if the pixels are included, or to S615 if not. In this embodiment, the brightness value corresponding to the set value of the "zebra 2 level" is assumed to be a brightness value corresponding to the set value of the "zebra 2 level" or higher. For example, if the set value of the "zebra 2 level" is 80%, the system control unit 50 determines whether the brightness values in the following range corresponding to 80% to 100% are included in the output image. This may be regarded that the system control unit 50 determines whether the brightness values in a range corresponding to the brightness range (partial brightness range) which includes brightness values equal to or higher than the set value (second set value) of the "zebra 2 level are included in the output image.

Full range (SDR): 204 (80%) to 255 (100%)
Video range (SDR): 191 (80%) to 235 (100%)
Full range (HDR): 818 (80%) to 1023 (100%)
Video range (HDR): 764 (80%) to 940 (100%)

In S614, the system control unit 50 displays a second zebra pattern (second pattern image) superimposed on the pixels having the brightness values corresponding to the set value of the "zebra 2 level". In this embodiment, an example when the second zebra pattern is a pattern image of stripes, of which lines are directed from the upper right to the lower left, will be described, but the pattern image is not especially limited. This may be regarded that the system control unit 50 generates an image (second image) by combining the second zebra pattern with a region of the output image corresponding to the set value of the "zebra 2 level" specified by the user operation. Further, this may also be regarded that the system control unit 50 selects whether the second zebra pattern is combined in accordance with the instruction from the user (instruction to change the setting parameter of the "zebra display setting" or the "zebra selection"). For the user to distinguish the first zebra pattern and the second zebra pattern, it is preferable that the mode of the first zebra pattern is different from the mode of the second zebra pattern.

In FIG. 8, a pattern image 802 indicates an example of the second zebra pattern. In the example in FIG. 8, an area of the right hand of the object has brightness values corresponding to the set value of the "zebra 2 level".

In S615, the system control unit 50 determines whether the setting parameter of the "zebra selection" is "zebra 1+2". Processing advances to S616 if the setting parameter is "zebra 1+2", or zebra display processing ends if not. The case where the setting parameter is "zebra 1+2" may be regarded as a case where the set value of the "zebra 1 level" and the set value of the "zebra 2 level" are specified.

In S616, just like S610, the system control unit 50 determines whether pixels having the brightness values corresponding to the set value of the "zebra 1 level" are included in the output image. Processing advances to S617 if the pixels are included, or to S618 if not.

In S617, just like S611, the system control unit 50 displays the first zebra pattern superimposed on the pixels having the brightness values corresponding to the set value of the "zebra 1 level".

In S618, just like S613, the system control unit 50 determines whether pixels having the brightness values corresponding to the set value of the "zebra 2 level" are included in the output image. Processing advances to S619 if the pixels are included, or the zebra display processing ends if not. Even in the middle of the zebra display processing, the zebra display processing may be interrupted (ended), as in the case where the user operates the operation unit 70, such as a mode dial.

In S619, just like S614, the system control unit 50 displays the second zebra pattern superimposed on the pixels having the brightness values corresponding to the set value of the "zebra 2 level". In the case where the first zebra pattern displayed in S617 and the second zebra pattern overlap, the system control unit 50 may display either one of the pattern images on this overlapping region, or the system control unit 50 may display both of the pattern images on this overlapping region.

Moving Image Capturing Processing (S314)

Figure 9:
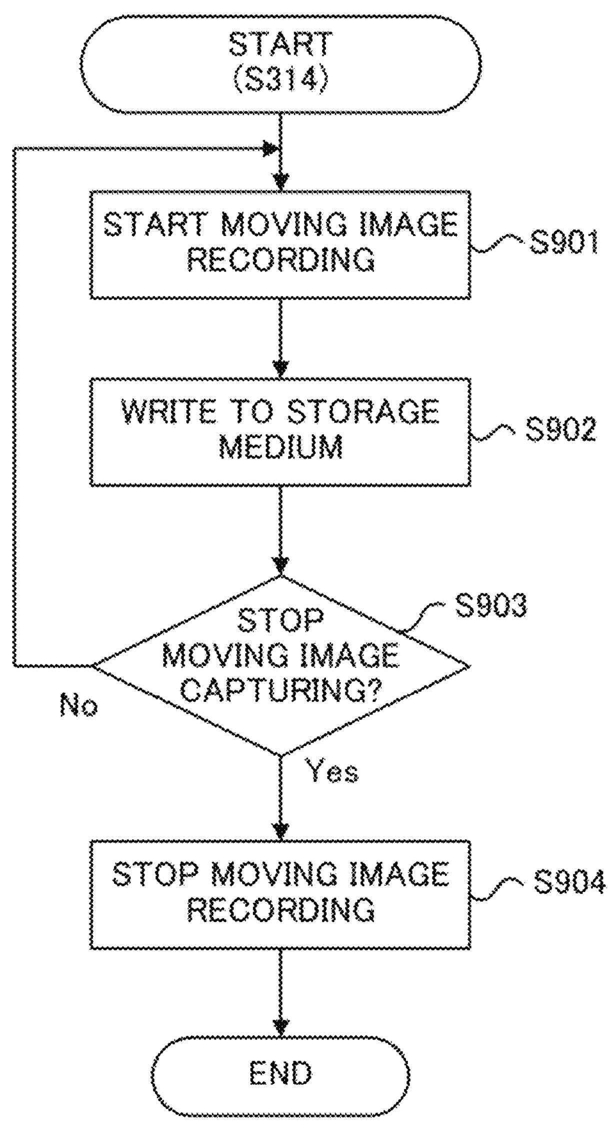
FIG. 9 is a flow chart depicting a moving image capturing processing according to the embodiment.

FIG. 9 is a flow chart depicting the moving image capturing processing (S314) according to this embodiment.

In S901, the system control unit 50 starts reading the image signals in the full range, and performs a moving image recording start processing, including a processing to write the moving image data in a buffer region. At this time, the system control unit 50 records the moving image using 8-bit brightness signals if SDR is set as the image for the image capturing, or using 10-bit brightness signals if HDR is set as the range for the image capturing.

In S902, the system control unit 50 writes the moving image data stored in the buffer region to the recording medium 200.

In S903, the system control unit 50 determines whether a stop of the moving image capturing is instructed. Processing advances to S904 if a stop of the moving image capturing is instructed, or to S901 if not. An example of the instruction to stop the moving image capturing is a case where the user presses the LV button 76.

In S904, the system control unit 50 performs the moving image recording stop processing, including the processing to stop reading of the image signals in the full range. Even in the middle of the moving image capturing processing, the moving image capturing processing may be interrupted (ended) like the case where the user operates the operation unit 70, such as a mode dial.

Advantageous Effect of this Embodiment

By setting the conditions to display the zebra pattern by percentage, the user can display the zebra pattern at an intended position, even if the external display does not support the full range, and the image is outputted after being converted into the video range. Further, the mode of the first zebra pattern is differentiated from the mode of the second zebra pattern, whereby the user can distinguish the first zebra pattern and the second zebra pattern from each other.

Modifications

A preferred embodiment of the present invention has been described, but the present invention is not limited to this embodiment, and may be modified and changed in various ways within the scope of the essence thereof.

In the above description on the embodiment, the zebra pattern 1 or the zebra pattern 2 is displayed, but three or more zebra patterns may be subject to selection and display. In the above description on the embodiment, the settable range of the "zebra 1 level" is 5% to 95%, and the settable range of the "zebra 2 level" is 50% to 100%, but the settable range is not limited.

In the above description on the embodiment, various processing steps are performed using the digital camera, but these processing steps may be performed by such electronic apparatuses as a PC and a display.

In the above description on the embodiment, an image combining the pattern image is outputted to the display unit or the external display, but the outputted image is not limited to this. For example, an image combining the pattern image may be outputted to one of the display unit and the external display, and an image not combining the pattern image may be outputted thereof.

In the above description on the embodiment, one brightness range is set in accordance with the specification of one percentage value, but the method of specifying the brightness range is not limited to this. For example, two percentage values corresponding to the minimum brightness and the maximum brightness of the brightness range to be set may be specified.

In the above embodiment, a captured image is used as the target image, but the target image is not limited to this. For example, the target image may be an illustration, a movie, a TV program image, a game image or the like.

The brightness range corresponding to the specified set value of the percentage is not limited to a brightness range which has a predetermined width centered around the specified set value (first brightness range) and a brightness range which includes brightness values equal to or higher than the specified set value (second brightness range). For example, the brightness range corresponding to the specified set value may be a brightness range that includes brightness values equal to or lower than the specified set value.

The present invention is also implemented by executing the following processing, that is, supplying software (programs) to implement the functions of the above embodiment to a system or an apparatus via a network or various storage media, and a computer (or CPU, MPU or the like) of the system or apparatus reading the program codes, and executing the program codes. In this case, the programs and storage media storing the programs constitute the present invention.

According to the present invention, a pattern image can be displayed at a position intended by the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-149903, filed on Aug. 19, 2019, which is hereby incorporated by reference herein in its entirety.

What is claimed is:

1. An electronic apparatus, comprising:
- an operation member configured to receive user operation to specify at least a part of a brightness range of a first image using a percentage;
- a combining unit configured to generate a second image by combining a pattern image with the first image; and
- an output unit configured to output the second image to a display unit,
- wherein the operation member receives user operation to specify at least one of a first set value and a second set value which are set values of the percentage,
- wherein the combining unit
  - in a case where the first set value is specified, combines a first pattern image with a first region of the first image, the first region corresponding to a first brightness range in accordance with the first set value, and
  - in a case where the second set value is specified, combines a second pattern image with a second region of the first image, the second region corresponding to a second brightness range in accordance with the second set value, and
- wherein the combining unit and the output unit are implemented by
  - at least one processor and at least one memory of the electronic apparatus, and/or
  - at least one circuit of the electronic apparatus.

2. The electronic apparatus according to claim 1, further comprising
- a conversion unit configured to acquire a target image as the first image in a case where the display unit supports the range of the target image, or converts the range of the target image and acquire the converted target image as the first image in a case where the display unit does not support the range of the target image,
- wherein the conversion unit is implemented by
  - at least one processor and at least one memory of the electronic apparatus, and/or
  - at least one circuit of the electronic apparatus.

3. The electronic apparatus according to claim 2, wherein the target image is a captured image.

4. The electronic apparatus according to claim 1, wherein the first brightness range is a brightness range which has a predetermined width centered around the first set value.

5. The electronic apparatus according to claim 1, wherein the second brightness range is a brightness range which includes brightness values equal to or higher than the second set value.

6. The electronic apparatus according to claim 1, wherein a mode of the first pattern image is different from a mode of the second pattern image.

7. The electronic apparatus according to claim 1, wherein the combining unit selects, based on an instruction from a user, whether the pattern image is combined.

8. The electronic apparatus according to claim 1, wherein the electronic apparatus is an imaging apparatus.

9. The electronic apparatus according to claim 1, wherein the display unit is a display unit included in the electronic apparatus, or a display apparatus that is separated from the electronic apparatus.

10. An electronic apparatus, comprising:

an operation member configured to receive user operation to specify at least a part of a brightness range of a first image using a percentage;

a combining unit configured to generate a second image by combining a pattern image with the first image; and an output unit configured to output the second image to a display unit, wherein the combining unit converts the percentage specified by the user operation into a brightness value in the range of the first image, using information that associates the percentage with the brightness value in accordance with the image range, and combines the pattern image with a region of the first image, the region including pixels with the brightness value after being converted, and wherein the combining unit and the output unit are implemented by at least one processor and at least one memory of the electronic apparatus, and/or at least one circuit of the electronic apparatus.

11. A method of controlling an electronic apparatus, the method comprising:

a receiving step of receiving user operation to specify at least a part of a brightness range of a first image using a percentage by an operation member of the electronic apparatus;

a combining step of generating a second image by combining a pattern image with the first image; and an output step of outputting the second image to a display unit, wherein the operation member receives user operation to specify at least one of a first set value and a second set value which are set values of the percentage, wherein, in the combining step, in a case where the first set value is specified, a first pattern image is combined with a first region of the first image, the first region corresponding to a first brightness range in accordance with the first set value, and in a case where the second set value is specified, a second pattern image is combined with a second region of the first image, the second region corresponding to a second brightness range in accordance with the second set value.

12. A non-transitory computer readable storage medium that stores a program, wherein the program causes a computer to execute:

a receiving step of receiving user operation to specify at least a part of a brightness range of a first image using a percentage by an operation member of the electronic apparatus;

a combining step of generating a second image by combining a pattern image with the first image; and an output step of outputting the second image to a display unit, wherein the operation member receives user operation to specify at least one of a first set value and a second set value which are set values of the percentage, wherein, in the combining step, in a case where the first set value is specified, a first pattern image is combined with a first region of the first image, the first region corresponding to a first brightness range in accordance with the first set value, and in a case where the second set value is specified, a second pattern image is combined with a second region of the first image, the second region corresponding to a second brightness range in accordance with the second set value.

* * * * *